United States Patent [19]
Gutris

[11] Patent Number: 6,023,118
[45] Date of Patent: Feb. 8, 2000

[54] STATOR OF SINGLE-PHASE ELECTRIC MOTOR WITH FOUR POLES HAVING PARALLEL AXES

[75] Inventor: Giorgio Gutris, Milan, Italy

[73] Assignee: European Electric Motors Design and Engineering Anstalt, Liechtenstein

[21] Appl. No.: 09/146,013

[22] Filed: Sep. 2, 1998

[30] Foreign Application Priority Data

Jul. 6, 1998 [IT] Italy .................................. MI98A1537

[51] Int. Cl.⁷ .................................................. H02K 17/10
[52] U.S. Cl. ........................ 310/172; 310/197; 310/182; 310/254; 310/216; 310/164
[58] Field of Search .................... 310/254, 216, 310/164, 162, 197, 182, 183, 172, 166, 180

[56] References Cited

U.S. PATENT DOCUMENTS

| | | | |
|---|---|---|---|
| 2,467,754 | 4/1949 | Koch | 310/172 |
| 3,983,621 | 10/1976 | Donahoo | 29/596 |
| 4,224,544 | 9/1980 | McKinnon et al. | 310/90 |
| 5,130,591 | 7/1992 | Sato | 310/172 |
| 5,627,424 | 5/1997 | Steiner | 310/258 |
| 5,729,071 | 3/1998 | Steiner | 310/254 |

FOREIGN PATENT DOCUMENTS 397143 11/1990 European Pat. Off. .

*Primary Examiner*—Nestor Ramirez
*Assistant Examiner*—Guillermo Perez
*Attorney, Agent, or Firm*—Greer, Burns & Crain, Ltd.

[57] ABSTRACT

A stator of an electric motor with four poles which are all parallel to each other and arranged in mutually opposite pairs around the rotor cavity. Each pole has a pole shoe which is inclined toward the inside of the stator so as to form, in practice, the rotor cavity. The mutually closer ends of the four pole shoes are mutually rigidly coupled by two thin bridges which are parallel to the axes of the poles and by two similar thin bridges arranged transversely to the axes of the poles. The poles of each pairs of parallel poles are also mutually rigidly coupled by transverse cores which can be inserted in them and removed from them, so as to allow the insertion of the bobbins of the winding coils on the cores before the cores are fitted on the respective poles.

6 Claims, 1 Drawing Sheet

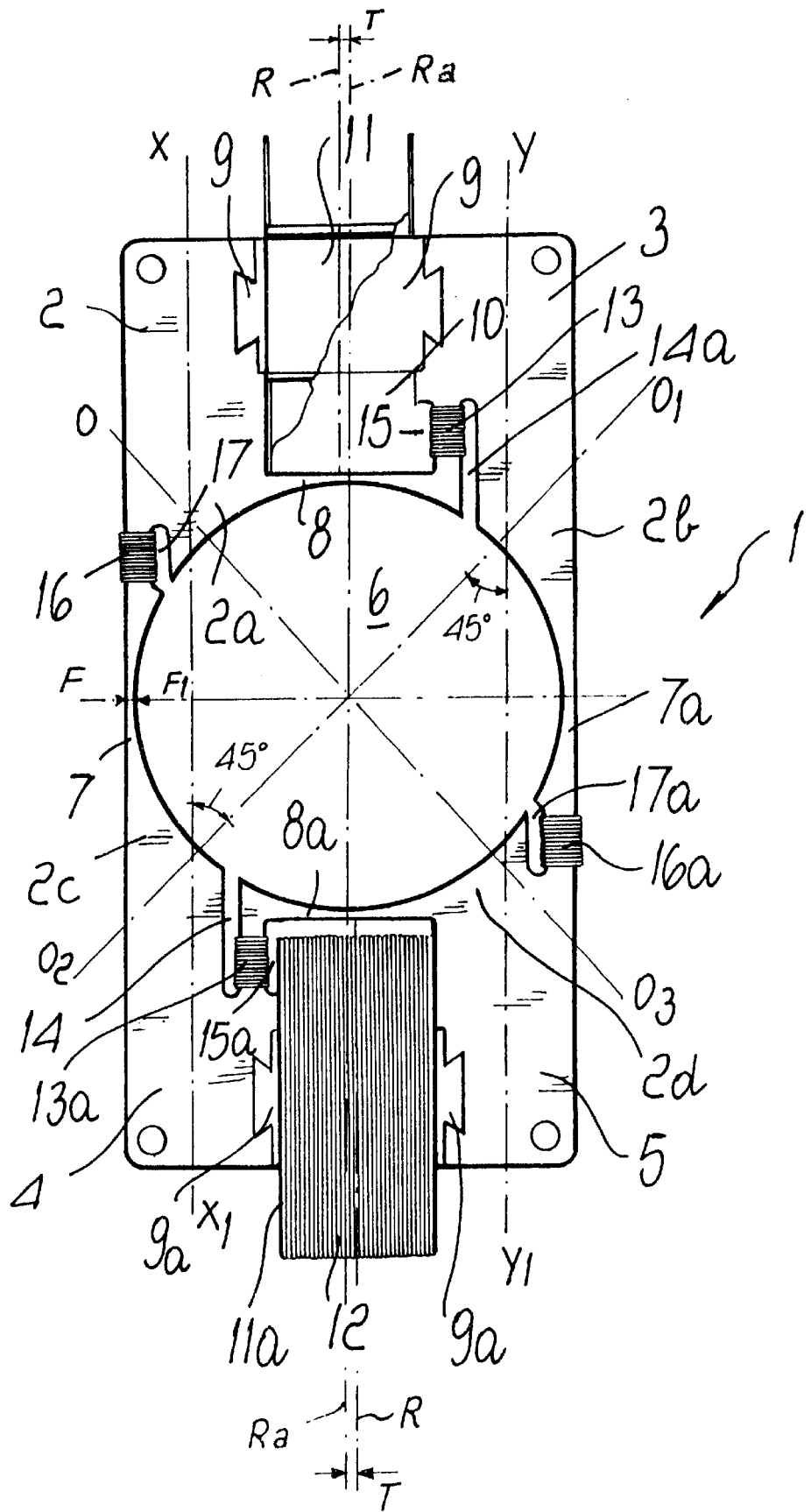

STATOR OF SINGLE-PHASE ELECTRIC MOTOR WITH FOUR POLES HAVING PARALLEL AXES

BACKGROUND OF THE INVENTION

The present invention relates to a stator of a single-phase electric motor with four salient poles arranged so that their axes are parallel and arranged in two pairs which are opposite with respect to the cylindrical cavity that contains the rotor, the pole shoe of each salient pole being inclined at an angle, with respect to the axis of the respective pole, so as to allow the pole shoes to form the cylindrical cavity for the rotor.

A conventional stator of a single-phase electric motor with four salient poles or the like usually has poles which are thicker than the yoke and are directed substantially radially, starting from the yoke whereto they are rigidly coupled, toward the inside of the stator. Each pole also has, at its end, a pole shoe. The four pole shoes surround the rotor without contact, i.e., they are arranged so that a cylindrical interspace (gap) is maintained between the pole shoes and the rotor. The thickness of the interspace can be constant or can be variously shaped according to the shape and arrangement of the pole shoes. Furthermore, the excitation winding is arranged around each one of the four poles and is constituted by an adapted number of turns of insulated conducting wire which, when electric current flows therethrough, induces in the stator an electromagnetic force that produces the rotation of the rotor.

It is also known that in so-called "shaded-pole" motors, the pole shoes are cut so as to form four auxiliary poles, around each of which a short-circuited winding is wound. The four auxiliary poles, together with the four windings, improve static torque at startup.

In practice, it has been found that in most cases the operation of winding the excitation windings around the four poles is highly onerous and that the material used is also considerable because it is not always distributed efficiently.

Some contrivances and/or modifications have been devised in order to reduce the amount of magnetic metal laminations used, to reduce the number of windings to just two and to simplify their assembly, but none of these contrivances has proved to be useful enough to be used in the vast majority of commercially available four-pole motors, much less in shaded-pole motors, which are used mainly in the field of fans in general and in the refrigeration industry and for power yields usually no higher than 50 W.

SUMMARY OF THE INVENTION

The aim of the present invention is to provide a stator for single-phase four-pole electric motors which is conceived and structured so as to have, with respect to current four-pole stators, a considerably reduced bulk in a direction which is perpendicular to the rotation axis of the rotor, with the advantage of limiting the bulk occupied by the motor and of facilitating the installation of the motor even in small spaces.

Another object of the present invention is to provide a four-pole stator which is shaped so as to significantly reduce the ferromagnetic material used to produce it and the length of the magnetic circuit, with consequent reductions in the losses in the ferromagnetic material and therefore in the required electromagnetic force.

Another object of the invention is to allow, together with a reduction in the length of the magnetic circuit, a better cooling of the excitation coils, with obvious significant advantages as regards reducing the copper used in the winding.

This aim, these objects and others which will become apparent hereinafter are achieved by a stator of a single-phase four-pole electric motor which is constituted, according to the present invention, by four poles which are substantially shaped like parallelepipeds and are arranged in pairs and side by side along parallel axes, said pairs of poles being arranged mutually opposite with respect to a cylindrical cavity of the rotor, each pole having a pole shoe whose dimensions and inclination with respect to the axis of the respective pole are such as to allow the pole shoes to form, in a position which is centered with respect to the stator, said cavity for the rotor, mutually closer ends of said four pole shoes being mutually rigidly coupled mechanically by two bridges which are parallel to the longitudinal axes of the poles and by two similar thin bridges arranged transversely to the pairs of poles, a removable core being also provided between each pair of laterally adjacent poles and proximate to their end that is furthest from the respective pole shoe, said core being arranged transversely to the poles so as to form, between each pair of laterally adjacent poles, a substantially rectangular empty space which is delimited between said poles, said transverse bridges and said cores, said empty space being adapted to allow the insertion of a bobbin with an excitation coil on the corresponding core.

More particularly, the pole shoes that form the cylindrical cavity for accommodating the rotor are arranged so that their axis that passes through the center of the cavity is inclined, with respect to the longitudinal axis of the respective pole, preferably by 45°.

Furthermore, also according to the invention, in the case of a motor of the so-called "shaded pole" type, each one of the four pole shoes has a notch which is adapted to form auxiliary poles meant to be wound with short-circuited windings, in order to improve static torque at motor startup, said four notches being all formed, according to the invention, so that they are substantially parallel to the axes of the salient poles.

Likewise, the two substantially rectangular empty spaces meant to accommodate the windings have a rectangular wider portion, proximate to the two opposite transverse thin bridges and parallel to the axis of the respective poles, which is capable of accommodating the short-circuited windings in order to form two of the four mutually opposite auxiliary poles.

BRIEF DESCRIPTION OF THE DRAWINGS

Further characteristics and advantages of the present invention will become apparent from the detailed description that follows, given with reference to the accompanying drawings, which are provided merely by way of non-limitative example and wherein the only figure is a schematic plan view of a stator for a single-phase motor with four salient poles of the shaded-pole type, executed according to the present invention and according to a preferred embodiment thereof.

DESCRIPTION OF THE PREFERRED EMBODIMENTS

With reference to the single figure, the stator for single-phase four-pole electric motor according to the present invention is substantially constituted by a pack of ferromagnetic laminations which are blanked in a particular manner and are packed according to conventional methods. The lamination pack has, in plan view, a highly rectangular shape which is much longer than it is wide and has a constant width.

This kind of stator, generally designated by the reference numeral 1 in the only accompanying figure, is constituted by four poles 2–3–4–5 which are substantially shaped like parallelepipeds and are arranged so that axes X–$X_1$ and Y–$Y_1$ are mutually parallel and divided into two pairs (2–3) and (4–5) which are diametrically mutually opposite with respect to a cylindrical cavity 6 meant to contain the rotor.

Each one of the four poles 2–3–4–5 has a pole shoe 2a–2b–2c–2d which is inclined toward the inside of the stator and has such dimensions that each pole shoe forms one quarter of the cylindrical extension of the cavity 6. The axis 0–$0_1$–$0_2$–$0_3$ of the pole shoes that passes through the center of the cavity 6 forms an angle of preferably approximately 45° with respect to the longitudinal axes X–$X_1$ and Y–$Y_1$ of the respective poles, as clearly shown in the figure; in practice, all the axes of the pole shoes are at 90° to each other and at 45° to the axes of the respective poles.

Furthermore, the four pole shoes are formed monolithically by blanking the laminations and are mechanically and electrically coupled to each other by means of four bridges. Two of the bridges, respectively designated by the reference numerals 7 and 7a, are parallel to the axes X–$X_1$ and Y–$Y_1$ of the corresponding poles 2–4 and 3–5; the other two bridges, respectively designated by the reference numerals 8 and 8a, are arranged at right angles to the axes of the poles.

The four bridges substantially also provide the mutual coupling of the four poles when the cores 9 and 9a are not inserted; their thickness, such as the one between the arrows F–$F_1$ in the figure, is approximately one millimeter.

A coupling element is provided between each pair of parallel poles 2–3 and 4–5; said coupling element is substantially a prism-shaped core or block, designated respectively by the reference numerals 9 and 9a; both of the coupling elements are made of ferromagnetic material and can be removed.

The cores 9–9a are arranged between the outermost free ends of the two laterally adjacent poles, so as to form, between the two poles, the core and the corresponding bridge 8–8a, a wide empty space 10, shown only at the poles 2–3, which is meant to accommodate one of the two coils of the winding that forms the four-pole magnetic field.

More specifically, the figure does not show the coil on the core 9 but only part of the conventional bobbin 11 on which the copper wire is to be wound, while the figure shows the bobbin 11a, with the corresponding winding 12, on the opposite core 9a.

The two cores 9–9a substantially contribute to mutually rigidly couple the poles of each pair and, at the same time, act as yoke, thus allowing the electromagnetic flux to close between the two poles of each pair.

Another important characteristic of the present invention is that by utilizing the highly peripheral position of the cores 9–9a, it allows the coils wound on the bobbins 11–11a to protrude outside the poles and thus remain in contact with the air, as shown clearly in the figure (and particularly by the coil 12), thus allowing to keep inside the stator only one side of each coil and to keep the remaining three sides thereof outside the stator, with the evident advantage of improving the cooling of said coils.

In the case of a motor of the shaded-pole type, the short-circuited copper windings 13–13a are wound between a notch 14 and 14a formed in the pole shoes 2b–2c and a recess 15–15a formed in the sides of the poles 3–4. The notches 14–14a and the recesses 15–15a have axes which are substantially parallel to the axes of the respective poles. The short-circuited copper windings 16–16a are instead wound between a notch 17–17a, formed in the pole shoes 2a–2d, and the outer edge of the respective pole shoe, in a position which is also parallel to the axes of the poles.

Furthermore, the mutually opposite empty spaces 10 between each pair of laterally adjacent poles, each of which is meant to accommodate a bobbin and the corresponding coil, have a median longitudinal axis R which is parallel to the axes X–Y of the poles but is slightly shifted by an extent T with respect to the median axis Ra of the stator that passes through the center of the cavity 6 of the rotor, in order to allow to form, in the shoe of the poles 3–4, the notches 14 and 14a and the notches 15 and 15a for accommodating the short-circuited windings.

From the above description given with reference to the only figure, it is evident that the flux generated by the coil wound on the bobbin 11 closes along the path constituted by the core 9, the pole 3, the pole shoe 2b, and then along the gap, the rotor (not shown) and the core again, through the adjacent pole shoe 2a and the pole 2.

Likewise and symmetrically, the flux generated by the coil 12 closes along the circuit constituted by the core 9a, the pole 4, the pole shoe 2c and then, after passing through the gap, the rotor and the gap, through the shoe 2d and the pole 5.

The bridges 7–7a and 8–8a magnetically connect to each other the four pole shoes and simultaneously provide the mechanical connection between the four pole shoes and mutually rigidly couple the four poles. Their dimensions depend more on this mechanical coupling function of theirs rather than on their magnetic function and is therefore influenced more by the mechanical qualities than by the electromagnetic qualities of the ferromagnetic metal plate used to produce the stator. Their preferred minimum thickness is approximately 1 millimeter.

The coils, two of which are shown here arranged on the two removable cores 9–9a, can equally be positioned on either of the two poles 2 or 3 and respectively 4 or 5 as deemed more convenient by the manufacturer, or there can be four such coils arranged so that there is one for each pole, if this is deemed more convenient.

The stator according to the present invention has a highly rectangular shape. Its width at the rotor is limited to the diameter of the rotor increased by the thickness of the gaps and of the two thin bridges described above. At the pairs of poles the width may be different in particular embodiments, but generally tends to be the same to allow more efficient utilization of the material that constitutes the stator.

Its length is constituted by the above defined width increased by the thickness of the cores 9–9a and by the twice the thickness of the empty space 10, mainly occupied by the windings.

Accordingly, the material required to produce the stator is reduced practically to a minimum.

Also according to the invention, the two poles of each mutually opposite pair can mutually diverge slightly outwards, so as to allow for example the insertion of larger cores 9–9a and thus allow, for example, to use larger coils, or for reasons related to the construction of the motor frame.

Practical tests conducted with a motor that uses the stator according to the invention have substantially shown that the motor is more efficient and more competitive than those that use current stators with four salient poles.

The disclosures of Italian Patent Application No. MI98A001537 from which this application claims priority are incorporated herein by reference.

What is claimed is:

1. A stator of a single-phase shaded four-pole electric motor, comprising four poles which are substantially shaped like parallelepipeds and are arranged in pairs and side by side along parallel axes, said pairs of poles being arranged mutually opposite with respect to a cylindrical cavity adapted to accommodate a rotor of the electric motor, each pole having a pole shoe whose dimensions and inclination with respect to the axis of the respective pole are such as to allow the pole shoes to form, in a position which is centered with respect to the stator, said cavity for the rotor, mutually closer ends of said four pole shoes being mutually rigidly coupled by two bridges which are parallel to the longitudinal axes of the poles and by two similar bridges arranged transversely to the pairs of poles, so as to provide a rigid coupling of the four poles, a removable prism-shaped core being also provided between each pair of parallel poles and proximate to their most peripheral end, said core being arranged transversely to the poles so as to form a substantially rectangular empty space between said two poles, the two cores and the two opposite bridges which lie transversely to the pole, said empty space being adapted to allow the insertion of a bobbin with an excitation coil on the corresponding core so as to keep only one side of each coil inside the stator and keep the other sides of said coil outside said stator, each pair of said pairs of poles being formed by two different poles, a first one having a notch which is defined in a respective pole shoe and constitutes an auxiliary pole, and a second one having a notch which is defined in the respective pole shoe and extending on an internal side of the pole that faces the first pole, all of said four notches being substantially parallel to the axes of the poles, said two substantially rectangular empty spaces, meant to accommodate the windings, having a rectangular wider portion at the notch of the auxiliary pole defined in the internal side of one of the poles of the pair of poles and substantially parallel to said notch, said spaces being able to accommodate said short-circuited windings in order to form two mutually opposite auxiliary poles of said four auxiliary poles.

2. The stator according to claim 1, wherein said four pole shoes that form said cylindrical cavity for the rotor are directed so that their axis that passes through the center of said cavity is inclined so as to form an angle of preferably 45° with respect to the longitudinal axis of the respective pole.

3. The stator according to claim 1, wherein said bridges have a thickness of approximately 1 millimeter and have a rectilinear profile, without any notches.

4. The stator according to claim 1, wherein the two poles of each pair of mutually opposite poles mutually diverge or are inclined outwards.

5. The stator according to claim 1, wherein said excitation coils can be wound directly on one pole or the other of each pair of mutually opposite poles or on both of them, instead of around said two removable cores.

6. The stator according to claim 1, wherein said empty spaces between each pair of laterally adjacent poles and the corresponding transverse bridge, each of which is meant to accommodate a prism-shaped core with a corresponding coil, have a median longitudinal axis which is parallel to the axes of the poles but is slightly shifted with respect to the median longitudinal axis that passes through the center of the cavity of the rotor, in order to allow to form in each pole said notches for accommodating short-circuited turns.

* * * * *